US011311868B2

(12) United States Patent
Schnitzler et al.

(10) Patent No.: US 11,311,868 B2
(45) Date of Patent: Apr. 26, 2022

(54) USE OF CATALYSTS FOR THE METATHESIS OF NITRILE RUBBER

(71) Applicant: ARLANXEO DEUTSCHLAND GMBH, Cologne (DE)

(72) Inventors: Silvia Schnitzler, Jüchen (DE); Sarah David, Dormagen (DE)

(73) Assignee: ARLANXEO DEUTSCHLAND GMBH, Dormagen (DE)

( * ) Notice: Subject to any disclaimer, the term of this patent is extended or adjusted under 35 U.S.C. 154(b) by 0 days.

(21) Appl. No.: 17/261,655

(22) PCT Filed: Jul. 9, 2019

(86) PCT No.: PCT/EP2019/068378
§ 371 (c)(1),
(2) Date: Jan. 20, 2021

(87) PCT Pub. No.: WO2020/020629
PCT Pub. Date: Jan. 30, 2020

(65) Prior Publication Data
US 2021/0260568 A1    Aug. 26, 2021

(30) Foreign Application Priority Data

Jul. 23, 2018 (EP) .................................... 18184880

(51) Int. Cl.
| | |
|---|---|
| *C08C 19/02* | (2006.01) |
| *B01J 31/22* | (2006.01) |
| *C08C 19/08* | (2006.01) |
| *C08C 19/00* | (2006.01) |

(52) U.S. Cl.
CPC ........ *B01J 31/2278* (2013.01); *B01J 31/2226* (2013.01); *C08C 19/02* (2013.01); *C08C 19/08* (2013.01); *B01J 2231/54* (2013.01); *B01J 2231/645* (2013.01); *B01J 2531/821* (2013.01); *C08C 2019/09* (2013.01)

(58) Field of Classification Search
CPC ............. B01J 31/2278; B01J 2531/821; B01J 2231/54; C08C 2019/09
See application file for complete search history.

(56) References Cited

U.S. PATENT DOCUMENTS

| | | | |
|---|---|---|---|
| 3,700,637 A | 10/1972 | Finch | |
| 4,464,515 A | 8/1984 | Rempel et al. | |
| 4,503,196 A | 3/1985 | Rempel et al. | |
| 4,581,417 A | 4/1986 | Buding et al. | |
| 4,631,315 A | 12/1986 | Buding et al. | |
| 4,746,707 A | 5/1988 | Braden et al. | |
| 4,795,788 A | 1/1989 | Braden et al. | |
| 4,978,771 A | 12/1990 | Braden et al. | |
| 6,683,136 B2 | 1/2004 | Guo et al. | |
| 2009/0069516 A1* | 3/2009 | Obrecht | B01J 31/1658 526/126 |
| 2013/0197218 A1* | 8/2013 | Mauduit | C07F 15/0046 544/64 |
| 2018/0127520 A1* | 5/2018 | Tsutsumi | B01J 31/00 |

FOREIGN PATENT DOCUMENTS

| | | |
|---|---|---|
| DE | 2539132 | 3/1977 |
| DE | 3433392 A1 | 3/1986 |
| DE | 3529252 A1 | 2/1987 |
| DE | 3540918 A1 | 5/1987 |
| DE | 3541689 A1 | 5/1987 |
| EP | 0134023 B1 | 5/1987 |
| EP | 0471250 A1 | 2/1992 |
| EP | 0298386 A1 | 10/1994 |
| EP | 2028194 B1 | 5/2010 |
| EP | 1826220 B1 | 12/2010 |
| EP | 2826802 A1 | 1/2015 |
| GB | 1558491 A | 1/1980 |
| WO | 0214376 A2 | 2/2002 |
| WO | 2004035596 A1 | 4/2004 |
| WO | 2008034552 A1 | 3/2008 |
| WO | 2011023674 A1 | 3/2011 |
| WO | 2012013208 A1 | 2/2012 |
| WO | 2013010676 A2 | 1/2013 |
| WO | 2013127880 A1 | 9/2013 |
| WO | 2014001109 A1 | 1/2014 |
| WO | 2014076548 A1 | 5/2014 |
| WO | 2014091157 A1 | 6/2014 |
| WO | 2014187830 A1 | 11/2014 |

OTHER PUBLICATIONS

International Preliminary Report on Patentability for corresponding application PCT/EP2019/068378 dated Jan. 26, 2021.
EP Search Report for corresponding application EP 18184880 dated Jan. 31, 2019.
M. Barbasiewicz, et al.; "Probing of the Ligand Anatomy: Effects of the Chelating Alkoxy Ligand Modifications on the Structure and Catalytic Activity of Ruthenium Carbene Complexes", Adv.Syth, Catal., 2007, 349, pp. 193-203.
A. Hryniewicka, et al; "New efficient ruthenium metathesis catalyst containing chromenyl ligand", Journal of Organometallic Chemistry, 695, 2010, pp. 1265-1270.
International Search Report for corresponding application PCT/EP2019/068378 dated Sep. 25, 2019.

* cited by examiner

*Primary Examiner* — Robert C Boyle
(74) *Attorney, Agent, or Firm* — Norris McLaughlin, PA

(57) ABSTRACT

The present invention relates to the use of specific catalysts for the metathesis degradation of nitrile rubber (NBR). The invention further relates to a method for preparing nitrile rubber with reduced molecular weight using specific catalysts.

20 Claims, No Drawings

USE OF CATALYSTS FOR THE METATHESIS OF NITRILE RUBBER

This is an application filed under 35 USC 371 based on PCT/EP2019/068378, filed 9 Jul. 2019, which in turn claims priority to EP 18184880.5, filed 23 Jul. 2018. The applicant makes all claims to priority to the foregoing. The applicant herein incorporates by reference the entirety of the foregoing applications herein.

The present invention relates to the use of specific catalysts for the metathesis degradation of nitrile rubber (NBR).

The invention further relates to a method for preparing nitrile rubber with reduced molecular weight using specific catalysts.

Nitrile rubber, also abbreviated to "NBR", is understood to mean rubbers which are co- or terpolymers of at least one α,β-unsaturated nitrile, at least one conjugated diene and optionally one or more further copolymerizable monomers.

Hydrogenated nitrile rubber, also abbreviated to "HNBR", is prepared by the hydrogenation of nitrile rubber. Correspondingly, in HNBR, the C=C double bonds of the copolymerized diene units are fully or partly hydrogenated. The degree of hydrogenation of the copolymerized diene units is typically within a range from 50 to 100%.

Hydrogenated nitrile rubber is a speciality rubber having a very good heat resistance, excellent resistance to ozone and chemicals and outstanding oil resistance.

The aforementioned physical and chemical properties of HNBR are combined with very good mechanical properties, especially a high abrasion resistance. For this reason, HNBR has found widespread use in a wide variety of different areas of application. HNBR is used, for example, for seals, hoses, drive belts and damping elements in the automotive sector, and also for stators, well seals and valve seals in the oil production sector, and also for numerous parts in the aviation industry, the electronics industry, in mechanical engineering and in shipbuilding.

HNBR types commercially available on the market typically have a Mooney viscosity (ML 1+4 at 100° C.) in the range from 55 to 105, corresponding to a weight-average molecular weight Mw (method of determination: gel permeation chromatography (GPC) against polystyrene equivalents) in the range from approximately 200 000 to 500 000. The polydispersity index PDI (PDI=Mw/Mn, where Mw is the weight-average and Mn is the number-average molecular weight) measured here, which gives information about the width of the molecular weight distribution, is commonly a value of 3 or more. The residual double bond content is usually in a range from 1 to 18% (determined by IR spectroscopy).

The processability of HNBR is subject to severe restrictions because of the relatively high Mooney viscosity. For many applications, it would be desirable to have an HNBR grade which has a lower molecular weight and hence a lower Mooney viscosity. This would significantly improve the processability.

Olefin metathesis (hereinafter also referred to as metathesis degradation or metathesis reaction) is a reaction for reducing the molecular weight with huge economic importance. The prior art discloses numerous methods for the metathesis of olefins, for instance NBR.

Thus, for example, WO-A-2002/014376 discloses what is known as the Grubbs-Hoveyda II catalyst of the formula (A)

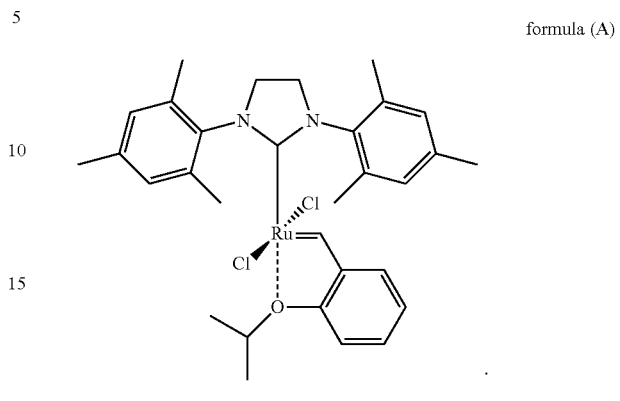

formula (A)

WO-A-2004/035596, WO-A-2013/127880 and WO-A-2014/001109 disclose that ruthenium complexes of the general formula (B)

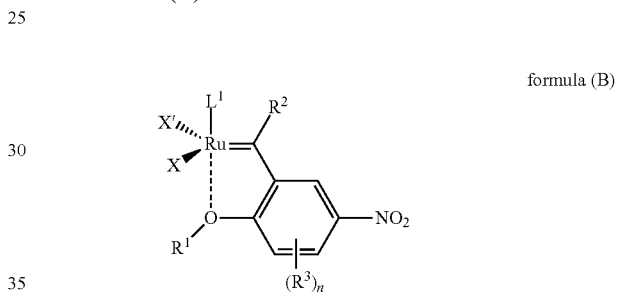

formula (B)

can be used as catalysts for metathesis reactions. These complexes are characterized by a nitro substitution on the benzylidene ligand. The catalyst is used for the synthesis of fine chemicals, natural products and also biologically active components.

WO-A-2014/001109 discloses metal complexes of the general formula (C)

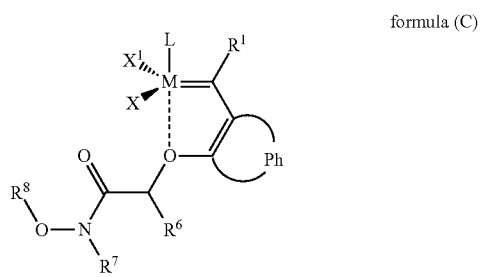

formula (C)

and the use thereof in metathesis reactions, wherein M is ruthenium or osmium, L is a neutral ligand, X and $X^1$ are anionic ligands, $R^1$ is hydrogen and $R^6$, $R^7$ and $R^8$ are $C_1$-$C_6$ alkyl. The use of the catalysts for the metathesis of nitrile rubbers is not disclosed.

WO-A-2014/076548 discloses ruthenium complexes of the general formula (D)

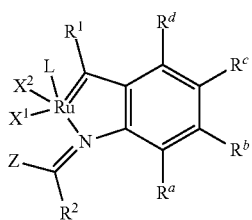

formula (D)

as catalysts for the metathesis of olefins. The use of the catalysts for the metathesis of nitrile rubbers is not disclosed.

EP-A-1 826 220 discloses the use of specific catalyst, for instance the catalyst of the formula (A) or catalysts of the general formula (B), the commercially available Zhan 1B catalyst for the metathesis degradation of nitrile rubbers.

EP-A-2 028 194 discloses methods for reducing the molecular weight of nitrile rubber, comprising a metathesis degradation of a nitrile rubber in the presence of a Grubbs III catalyst.

WO-A-2008/034552 discloses compounds of the general formula (E)

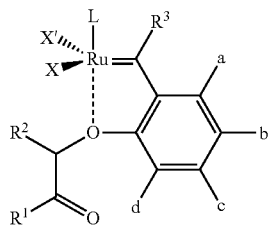

formula (E)

and also the preparation thereof and use thereof as catalysts in different metathesis reactions. These catalysts are also known under the name "Arlt catalysts".

WO-A-2011/023674 discloses methods for the metathesis degradation of nitrile rubber in the presence of specific metathesis catalysts, for instance what are referred to as the "Arlt catalysts".

In Adv. Synth. Catal. 2007, 349, 193-203, a catalyst of the formula (F) is disclosed:

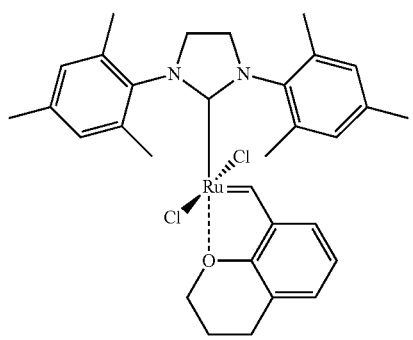

formula (F)

In J. Organomet. Chem. 2010, 695, 1265-1270, a catalyst of the formula (G) is disclosed:

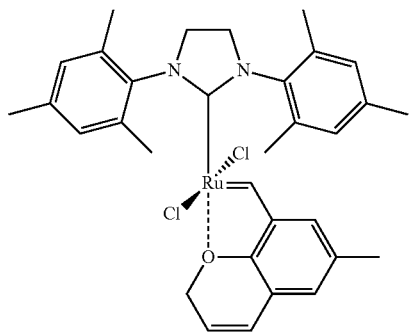

formula (G)

WO-A-2014/091157 discloses ruthenium complex catalysts of the general formula (H)

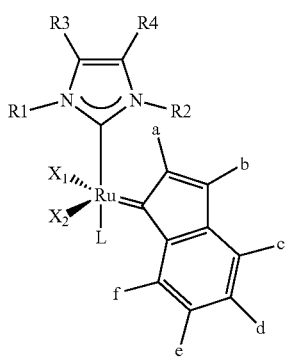

formula (H)

WO-A-2012/013208 discloses ruthenium complexes of the general formula (I) and also the use thereof as catalyst for a chemical reaction, for example a metathesis reaction such as a ring-closing metathesis (RCM), cross-metathesis (CM) and a ring-opening metathesis polymerization (ROMP).

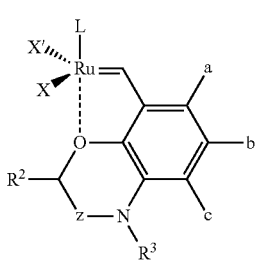

formula (I)

The prior art shows that there is a great demand for stable and inexpensive metathesis catalysts which have high activity in metathesis reactions with nitrile rubber and also enable a metathesis reaction of the nitrile rubber in a short time. Furthermore, the prior art teaches that it cannot be readily assumed that known ruthenium complexes are equally suitable for every type of metathesis of every olefin.

The known metathesis catalysts are as yet unsatisfactory for certain applications, especially for the metathesis of nitrile rubber.

Accordingly, an object of the present invention was the provision of suitable catalysts for the metathesis of nitrile rubber (NBR) with metathesis activity, preferably with improved metathesis activity in the metathesis degradation of nitrile rubber.

Surprisingly, it was possible to solve this problem using catalysts of the general formula (I) depicted below, especially by the formulae (I.A), (I.B) and (I.C) depicted below.

The solution to the problem, and the subject of the present invention, is therefore the use of catalysts of the general formulae (I) described below in detail, and also preferably the use of the catalysts of the formulae (I.A), (I.B) and (I.C) in a method for the metathesis of nitrile rubber.

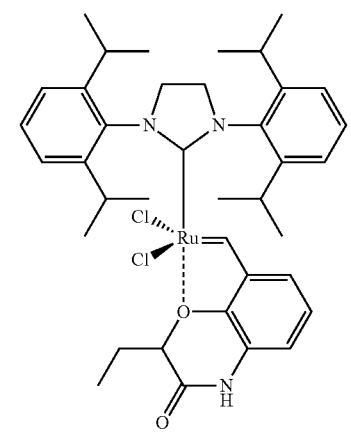

(I.A)

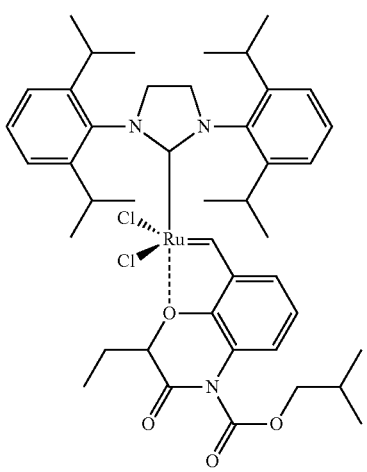

(I.B)

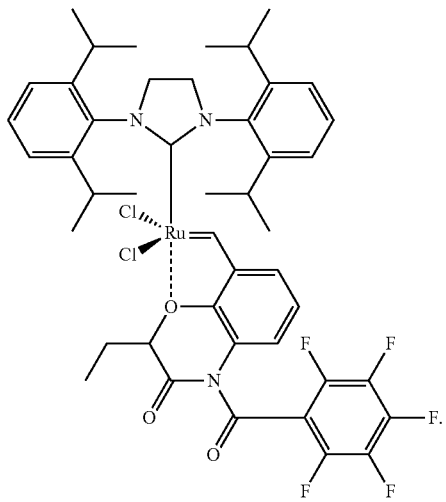

(I.C)

Surprisingly, it is possible to carry out the metathesis degradation of nitrile rubber without noticeable gel formation using the catalysts of the formula (I.A), (I.B) and (I.C). The catalysts of the formula (I.A) and (I.B) also have a higher metathesis activity than the catalysts known from the prior art for the metathesis of nitrile rubber, Grubbs II catalyst and Hoveyda-Grubbs II catalyst.

The term "substituted" used in the context of this application means that a hydrogen atom on a given radical or atom is replaced by one of the groups specified in each case, with the proviso that the valency of the given atom is not exceeded and the substitution leads to a stable compound.

In the context of this application and invention, all definitions of radicals, parameters or elucidations given above and below, in general terms or within areas of preference, can be combined with one another in any desired manner, including between the respective areas and areas of preference.

Catalysts

Catalysts which are suitable for use in a method for the metathesis of nitrile rubber are those of the general formula (I)

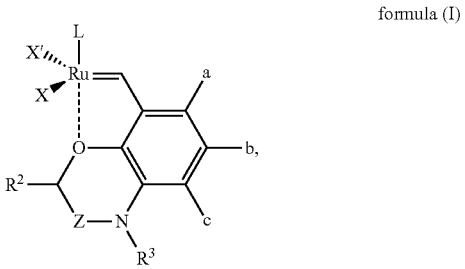

formula (I)

wherein

X and $X^1$ in each case independently of one another are halogens, preferably selected from the group consisting of Cl, Br and I, L is an uncharged ligand of the formula $L^1$, $L^2$, $L^3$ or $L^4$,

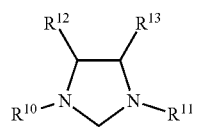
(L$^1$)

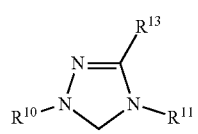
(L$^2$)

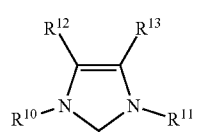
(L$^3$)

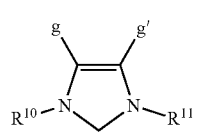
(L$^4$)

wherein $R^{10}$ and $R^{11}$ in each case independently of one another are a substituted or unsubstituted side chain comprising 1 to 30 carbon atoms and optionally comprising one or more functional groups, and
wherein $R^{12}$ and $R^{13}$ in each case independently of one another are H, $C_{1-6}$ alkyl, optionally substituted with an alkoxy radical $OR^{15}$, or aryl optionally substituted with an alkoxy radical $OR^{15}$, or form a 3- or 4-membered alkene bridge, and
wherein $R^{15}$ is selected from the group consisting of $C_{1-20}$ alkyl, aryl and $C_{7-18}$ aralkyl, and
wherein g and g' are in each case halogens,
z is a methyl or carbonyl group,
a, b and c are in each case H;
$R^2$ is selected from the group consisting of H, $C_{1-12}$ alkyl, preferably methyl, ethyl or isopropyl, $C_{5-12}$ cycloalkyl, $C_{7-18}$ aralkyl or aryl; and
$R^3$ is selected from the group consisting of H, $C_{1-12}$ alkyl, $C_{5-12}$ cycloalkyl, $C_{7-18}$ aralkyl, aryl, $C_{1-12}$ haloalkyl, $C_{1-12}$ ammonium alkyl, $C_{1-12}$ pyridinium alkyl, $C_{1-12}$ aldehyde alkyl, $C_{1-12}$ nitroalkyl, nitrile or a radical selected from the group consisting of ketones $COR^4$, esters $CO_2R^4$, oxalates $COCO_2R^4$, sulfones $SO_2R^4$ or amides $CONHR^4$, where $R^4$ is selected from the group consisting of H, $C_{1-12}$ alkyl, $C_{5-12}$ cycloalkyl, $C_{7-18}$ aralkyl, aryl, $C_{1-12}$ haloalkyl, $C_{1-12}$ ammonium alkyl, $C_{1-12}$ pyridinium alkyl, $C_{1-12}$ aldehyde alkyl, $C_{1-12}$ nitroalkyl and nitrile, or $R^3$ is a side chain of the formula $R^{3c}$, $R^{3d}$, $R^{3e}$, $R^{3f}$, $R^{3g}$, $R^{3h}$, $R^{3i}$, $R^{3j}$, $R^{3k}$, $R^{3l}$, $R^{3m}$, $R^{3n}$, $R^{3o}$ or $R^{3p}$:

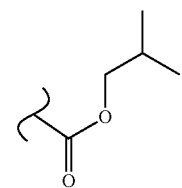
(R$^{3c}$)

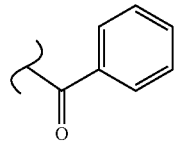
(R$^{3d}$)

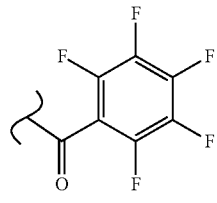
(R$^{3e}$)

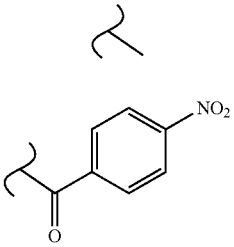
(R$^{3f}$)

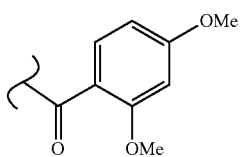
(R$^{3g}$)

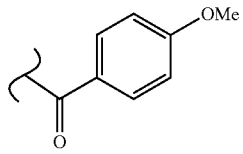
(R$^{3h}$)

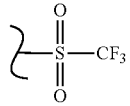
(R$^{3i}$)

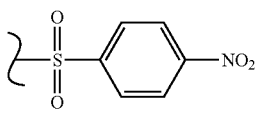
(R$^{3j}$)

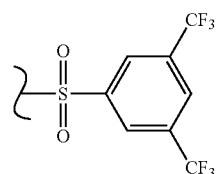
(R$^{3k}$)

(R$^{3l}$)

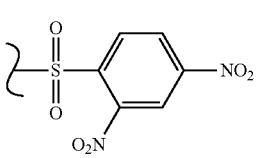
(R$^{3m}$)

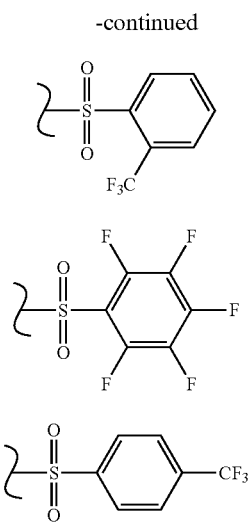

or, if z is methyl, $R^3$ is a side chain of the formula $R^{3a}$ or $R^{3b}$:

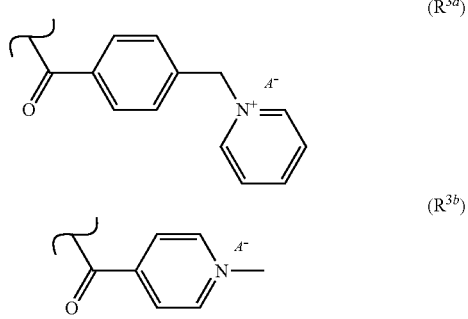

wherein $A^-$ is selected from the group consisting of $F^-$, $Cl^-$, $Br^-$, $I^-$, tetrafluoroborate $BF_4^-$, hexafluorophosphate $PF_6^-$ and bis(trifluoromethylsulfonyl)amide $NTf_2^-$.

The term "$C_{1-30}$ alkyl" denotes branched and unbranched alkyl groups having 1 to 30 carbon atoms. The term "$C_{1-20}$ alkyl" denotes branched and unbranched alkyl groups having 1 to 20 carbon atoms. The term "$C_{1-12}$ alkyl" denotes branched and unbranched alkyl groups having 1 to 12 carbon atoms. The term "$C_{1-6}$ alkyl" denotes branched and unbranched alkyl groups having 1 to 6 carbon atoms. The term "$C_{1-4}$ alkyl" denotes branched and unbranched alkyl groups having 1 to 4 carbon atoms. Examples thereof are methyl, ethyl, n-propyl, isopropyl, n-butyl, isobutyl, sec-butyl, tert-butyl, n-pentyl, isopentyl, neopentyl and hexyl. The abbreviations M, Et, n-Pr, i-Pr, n-Bu, t-Bu, etc. are likewise accordingly used for the abovementioned groups. Unless defined otherwise, the designations propyl, butyl, pentyl and hexyl include all possible isomeric forms. For example, the term "propyl" includes n-propyl and isopropyl, the term "butyl" includes isobutyl, sec-butyl and tert-butyl, etc.

The term "$C_{1-12}$ ammonium alkyl" denotes alkyl chains having 1 to 12 carbon atoms and an ammonium function. The term "$C_{1-12}$ pyridinium alkyl" denotes alkyl chains having 1 to 12 carbon atoms and a pyridinium function.

The term "$C_{1-12}$ aldehyde alkyl" relates to an alkyl chain having 1 to 12 carbon atoms and comprising an aldehyde function. The expression "$C_{1-12}$ nitroalkyl" relates to an alkyl chain having 1 to 12 carbon atoms and comprising a nitro function. The expression "$C_{1-12}$ nitrile alkyl" relates to an alkyl chain having 1 to 12 carbon atoms and comprising a nitro function.

The expression "$C_{1-12}$ alkoxy" relates (even when it is a constituent of other radicals) to branched and unbranched alkoxy groups having 1 to 12 carbon atoms; accordingly, the expression "$C_{1-6}$ alkoxy" relates to branched and unbranched alkoxy groups having 1 to 6 carbon atoms, and the term "$C_{1-4}$ alkoxy" relates to branched and unbranched alkoxy groups having 1 to 4 carbon atoms. Preference is given to alkoxy groups having 1 to 6 carbon atoms, particularly preferably 1 to 4 carbon atoms. Examples include: methoxy, ethoxy, propoxy, butoxy and pentoxy. The abbreviations MeO, EtO, PrO, etc., may also be used for the abovementioned groups. Unless stated otherwise, the definitions in the cases of propoxy, butoxy and pentoxy include all conceivable isomeric forms of the respective radicals. Thus, for example, the term "propoxy" includes n-propoxy and isopropoxy, the term "butoxy" includes isobutoxy, sec-butoxy and tert-butoxy, etc.

The term "$C_{5-12}$ cycloalkyl" relates (even when it is a constituent of other radicals) to cyclic alkyl groups having 5 to 12 carbon atoms. Examples include: cyclopentyl and cyclohexyl. Unless stated otherwise, the cyclic alkyl groups may be substituted by one or more radicals selected from the group consisting of methyl, ethyl, isopropyl, tert-butyl, hydroxy, fluorine, chlorine, bromine and iodine. Furthermore, the cyclic alkyl groups may be substituted by one or more functions such as an amino function; they will then be referred to as aminocycloalkyl.

The term "aryl" relates (even when it is a constituent of other radicals) to aromatic ring systems having 6 to 20 carbon atoms. Examples include: phenyl and naphthyl; the preferred aryl radical is phenyl. Unless stated otherwise, the aromatics may be substituted by one or more radicals selected from the group consisting of methyl, ethyl, isopropyl, tert-butyl, hydroxy, fluorine, bromine and iodine. Furthermore, the aromatics may comprise one or more functional groups; they are then referred to as "heteroaryl".

The expression "$C_{7-18}$ aralkyl" relates (even when it is a constituent of other radicals) to branched and unbranched alkyl groups which have 1 to 8 carbon atoms and are substituted by an aromatic ring system having 6 or 10 carbon atoms; accordingly, the expression "$C_{7-11}$ aralkyl" denotes branched and unbranched alkyl groups which have 1 to 4 carbon atoms and are substituted by an aromatic ring system having 6 carbon atoms. Examples include: benzyl and 1- and 2-phenylethyl. Unless stated otherwise, the aromatics may be substituted by one or more radicals selected from the group consisting of methyl, ethyl, isopropyl, tert-butyl, hydroxy, fluorine, bromine and iodine.

The symbol "⌒" represents a boundary in a covalent bond, in order to simply represent the side chains of compounds of the present invention. For example, some examples of the present invention relate to a plurality of optional side chains $R^3$. A covalent bond intersected by the above symbol is attached to the nitrogen atom (N) of the oxazine or oxazinone function.

In a preferred embodiment, the catalyst of the general formula (I) is used, wherein $R^{10}$ and $R^{11}$ in each case independently of one another are $C_{1-30}$ alkyl, optionally substituted with an alkoxy radical $OR^{15}$, $C_{2-30}$ alkenyl, optionally substituted with an alkoxy radical $OR^{15}$, aryl, optionally substituted with an alkoxy radical $OR^{15}$, aminoalkyl or aminocycloalkyl.

In a particularly preferred embodiment, the catalyst of the general formula (I) is used, wherein L has the following meanings ($L^{1a}$), ($L^{1b}$), ($L^{1c}$), ($L^{1d}$), ($L^{1e}$), ($L^{1f}$), ($L^{1g}$):

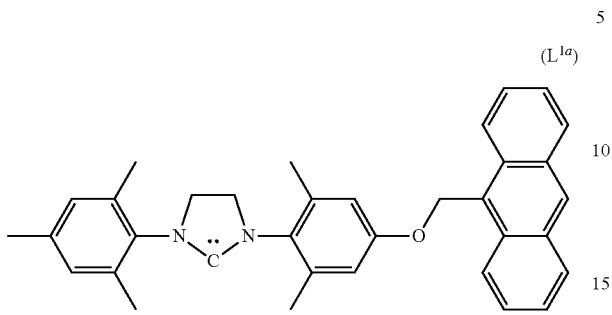
($L^{1a}$)

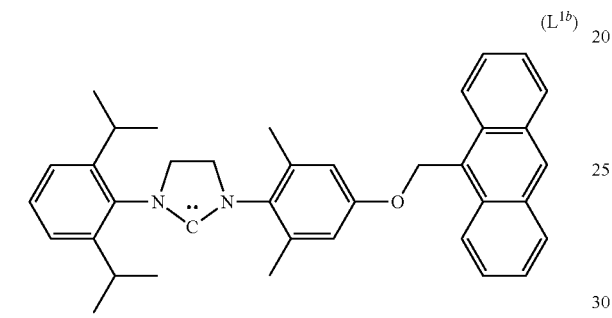
($L^{1b}$)

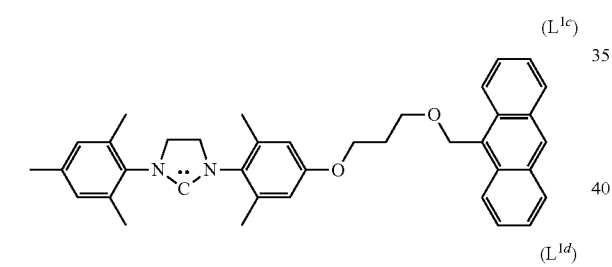
($L^{1c}$)

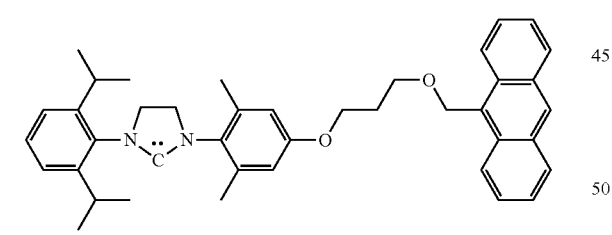
($L^{1d}$)

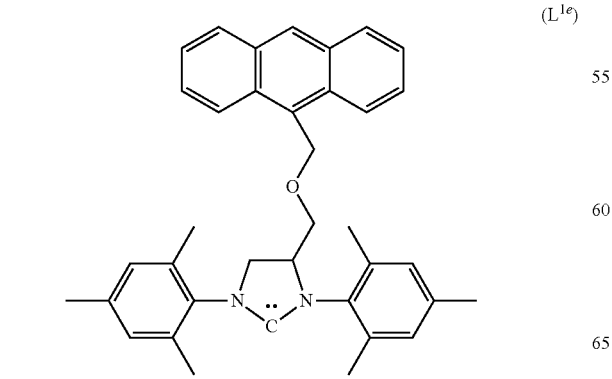
($L^{1e}$)

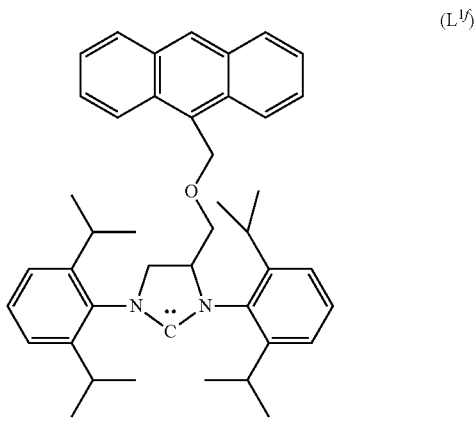
($L^{1f}$)

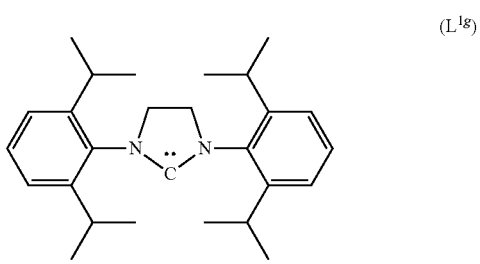
($L^{1g}$)

Particular preference is given to catalysts of the general formula (I), wherein L is $L^{1g}$.

The ligand (L) bonds via the carbon atom (carbene radical, marked with 2 dots) to the ruthenium (Ru) metal atom of the general formula (I).

In a preferred embodiment, the catalyst of the general formula (I) is used, wherein $R^3$ is hydrogen or a side chain of the formula $R^{3c}$, $R^{3d}$, $R^{3e}$, $R^{3f}$, $R^{3g}$, $R^{3h}$, $R^{3i}$, $R^{3j}$, $R^{3k}$, $R^{3l}$, $R^{3m}$, $R^{3n}$, $R^{3o}$ or $R^{3p}$.

In a particularly preferred embodiment, the catalyst of the general formula (I) is used, wherein $R^3$ is hydrogen or a side chain of the formula $R^{3c}$ or $R^{3e}$.

In a very particularly preferred inventive use, the catalyst of the general formula (I) has the following meanings:

X is Cl;

L is $L^{1g}$;

z is carbonyl;

a, b, c are H;

$R^2$ is $C_1$-$C_{12}$ alkyl, preferably methyl, ethyl or isopropyl, and $R^3$ is H, $R^{3c}$ or $R^{3e}$.

Catalysts of the general formula (I) which are most suitable for use in a method for the metathesis of nitrile rubber are the catalysts of the formula (I.A), (I.B) and (I.C), particularly preferably catalysts of the formula (I.A) and (I.B) and very particularly preferably of the formula (I.B).

(I.A)

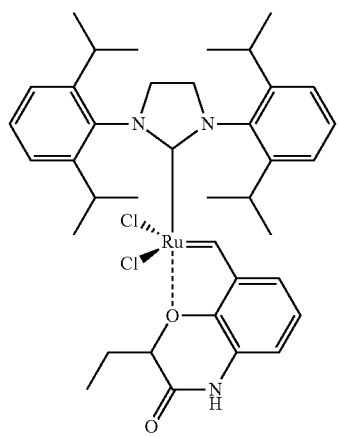

(I.B)

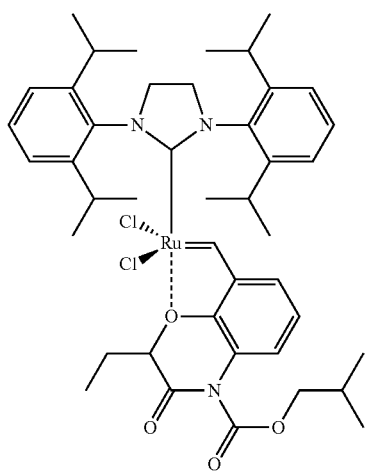

(I.C)

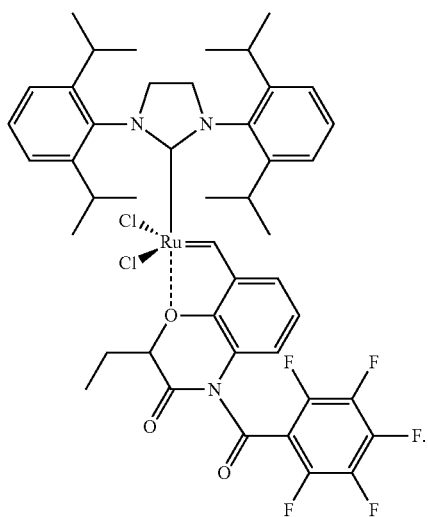

Catalysts of the general formula (I), and also the preparation thereof, are disclosed in WO-A-2012/013208.

The catalyst of the formula (I.A) corresponds to compound P33 of WO-A-2012/013208.

The catalyst of the formula (I.B) corresponds to compound P34 of WO-A-2012/013208.

The catalyst of the formula (I.C) corresponds to compound P36 of WO-A-2012/013208.

In the context of the inventive use, a nitrile rubber is subjected to a metathesis reaction in the presence of a catalyst of the general formula (I), preferably in the presence of a catalyst of the formula (I.A), (I.B) and (IC).

Formula (I.A): [1,3-Bis(2,6-diisopropylphenyl)imidazolidin-2-ylidene]{2-ethyl-3-oxo-3,4-dihydro-2H-benzo[b][1,4]oxazin-8-yl]methylene}ruthenium(II) dichloride $C_{38}H_{50}Cl_2N_3O_2Ru$; molecular weight, 752.23 g/mol; green powder. The preparation of the catalyst is known to those skilled in the art from WO-A-2012/013208.

Formula (I.B): [1,3-Bis(2,6-diisopropylphenyl)imidazolidin-2-ylidene]{(2-ethyl-4-(isobutoxycarbonyl)-3-oxo-3,4-dihydro-2H-benzene[b][1,4]oxazin-8-yl)
methylene}ruthenium(II) dichloride; $C_{43}H_{58}Cl_2N_3O_4Ru$; molecular weight: 852.28 g/mol; green powder. The preparation of the catalyst is known to those skilled in the art from WO-A-2012/013208.

Formula (I.C): [1,3-Bis(2,6-diisopropylphenyl)imidazolidin-2-ylidene{(2-ethyl-3-oxo-4-(perfluorophenylcarbonyl)-3,4-dihydro-2H-benzo[b][1,4]oxazin-8-yl)
methylidene}ruthenium(II) dichloride; $C_{45}H_{49}Cl_2F_5N_3O_3Ru$; molecular weight: 946.21° g/mol; green powder. The preparation of the catalyst is known to those skilled in the art from WO-A-2012/013208.

Further suitable catalysts for the inventive use are the catalysts P32, P35 and P37 to P59, known from WO-A-2012/013208, of the formulae stated below (I.D.) to (I.Z) and also (I.x) and (I.y):

(I.D)

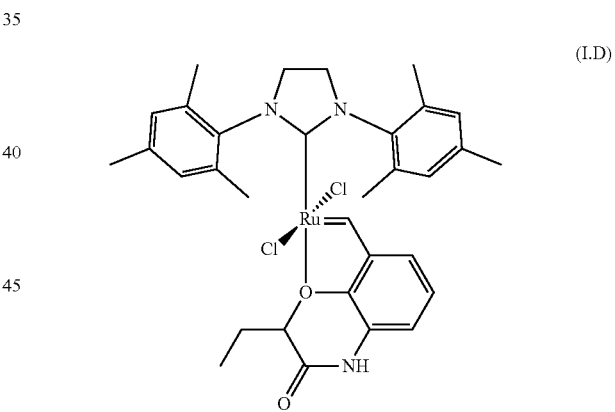

(I.E)

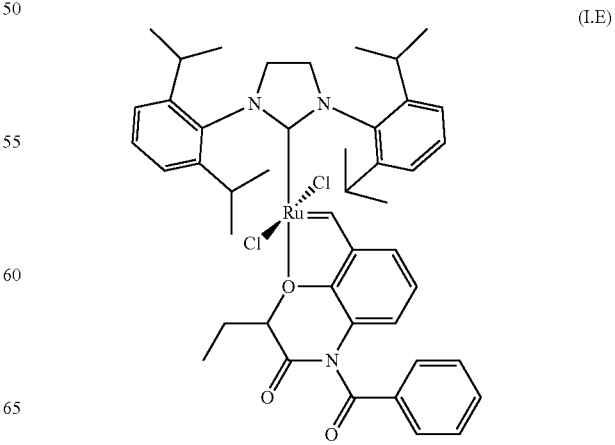

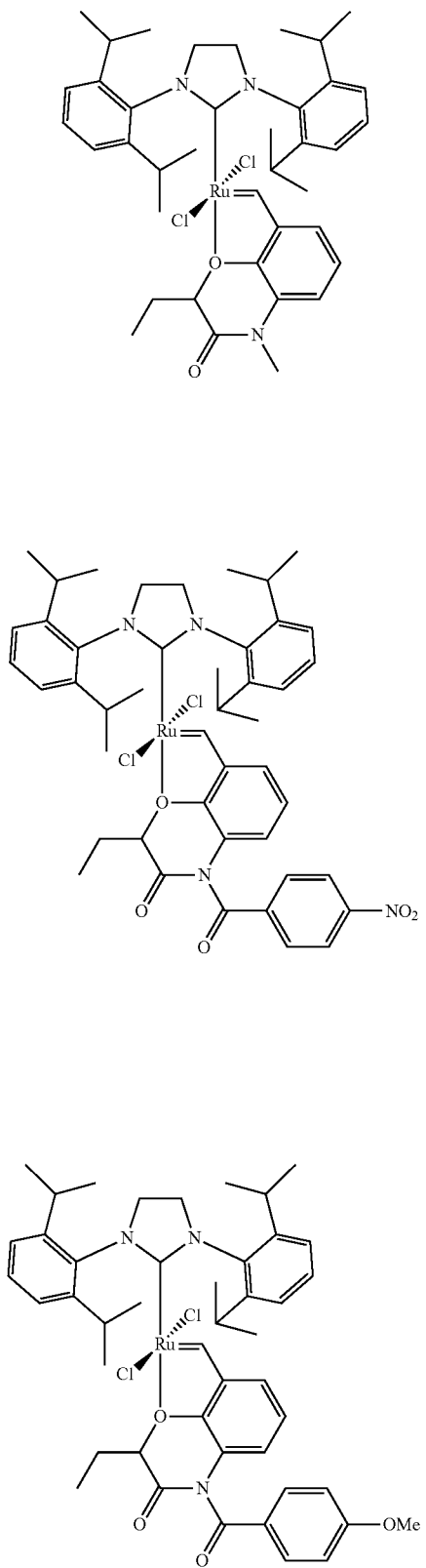
(I.F)
(I.G)
(I.H)
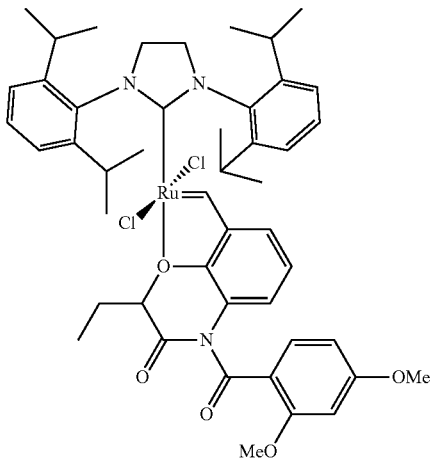
(I.I)
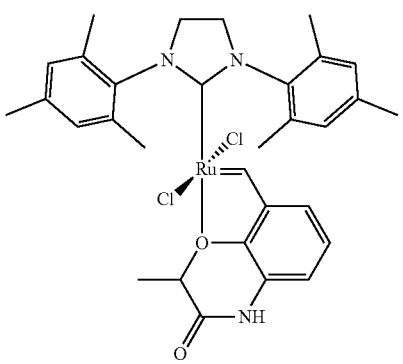
(I.J)
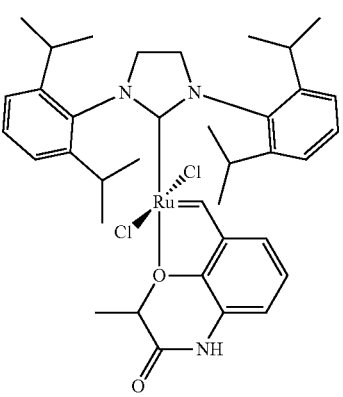
(I.K)
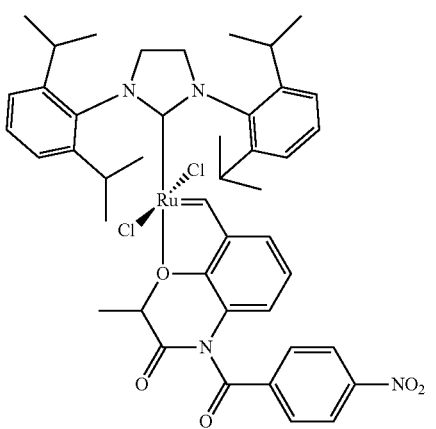
(I.L)

(I.M)
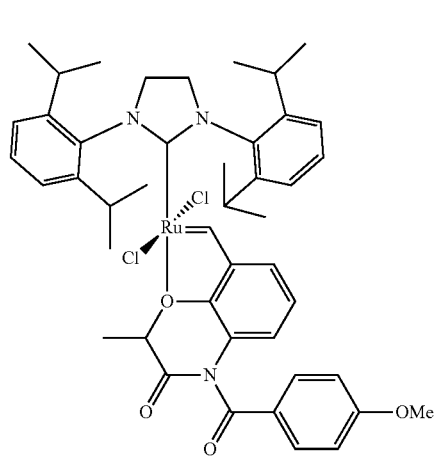
(I.N)
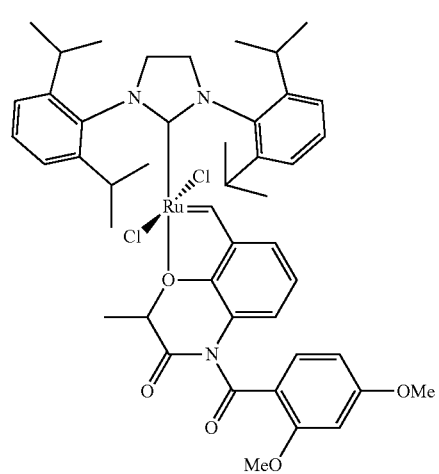
(I.O)
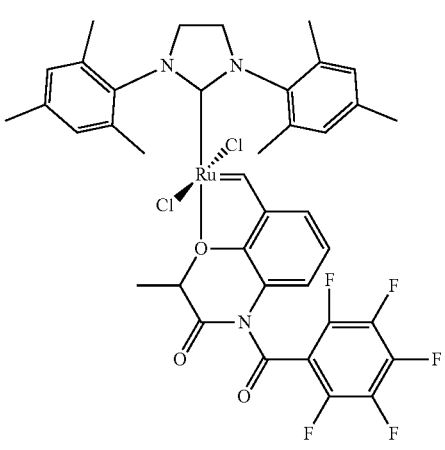
(I.P)
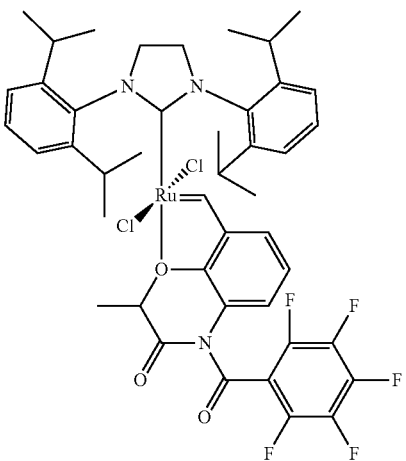
(I.Q)
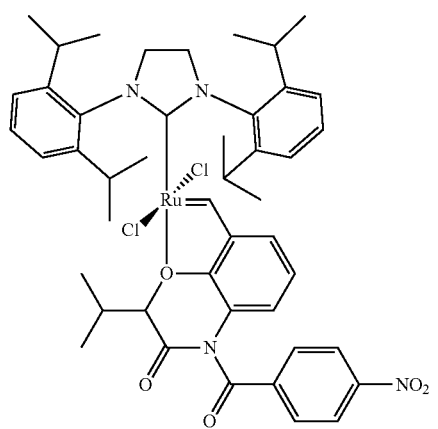
(I.R)
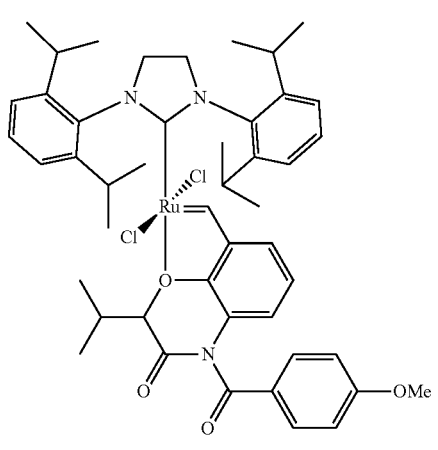

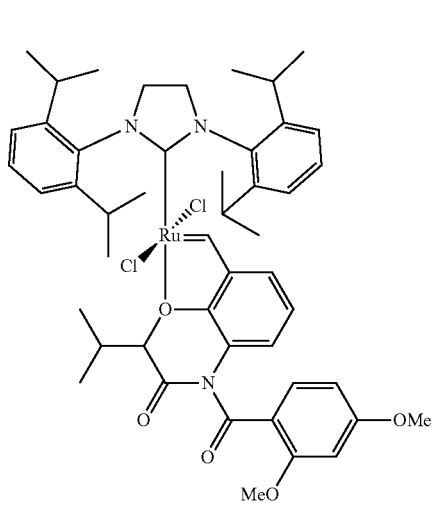
(I.S)
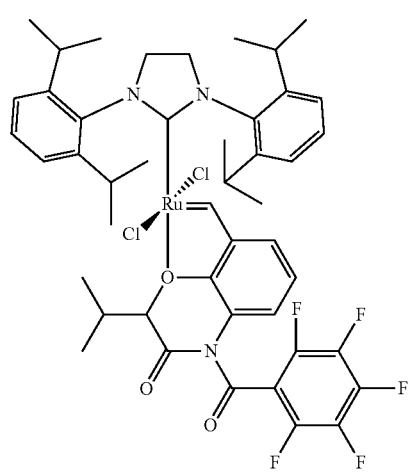
(I.T)
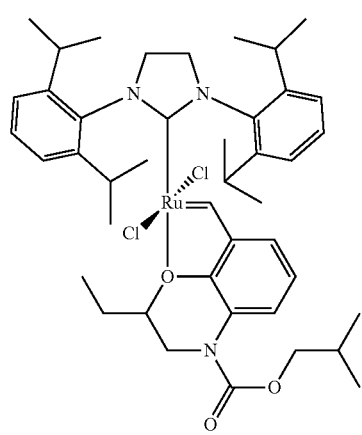
(I.U)
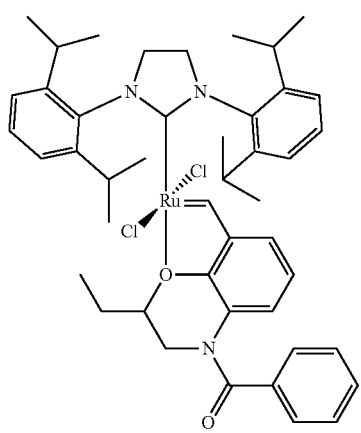
(I.V)
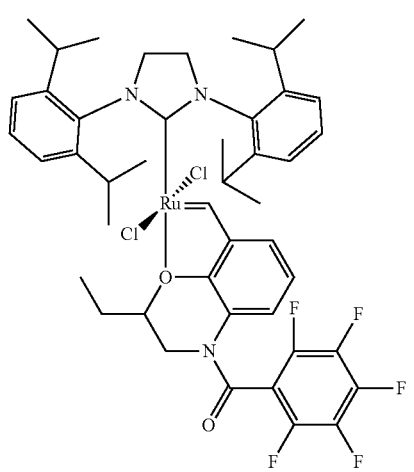
(I.W)
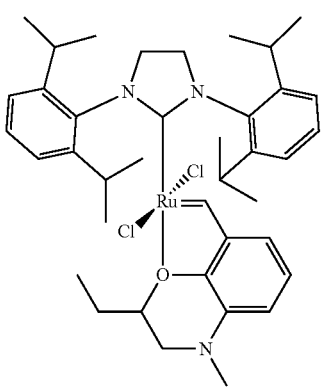
(I.X)

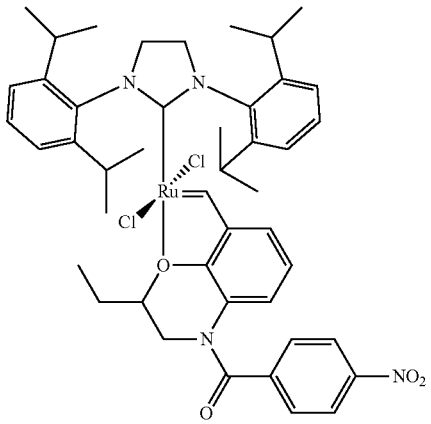
(I.Y)

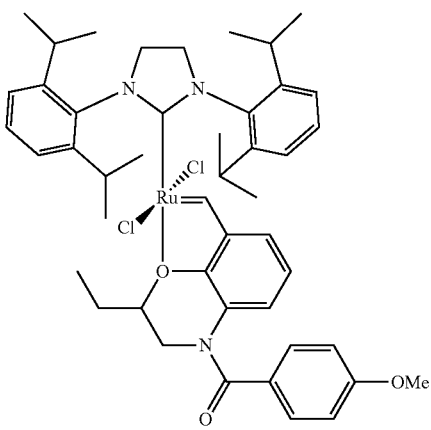
(I.Z)

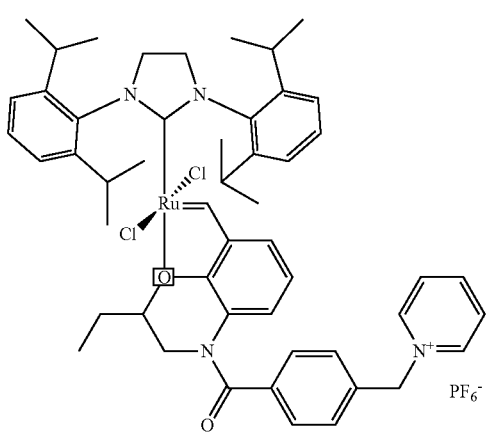
(I.x)

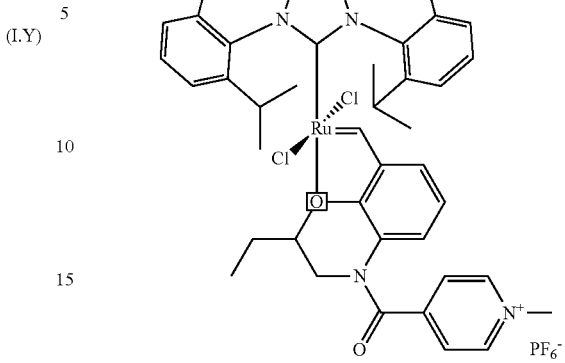
(I.y)

Particular preference is given to using the catalysts of the formula (I.A) and (I.B) for the metathesis of nitrile rubber. Very particular preference is given to the use of the catalyst of the formula (I.B). The catalysts of the formula (I.A) and (I.B) have a higher metathesis activity in the metathesis degradation of nitrile rubber than that of the catalysts known from the prior art, Grubbs II and Hoveyda-Grubbs.

The catalyst of the formula (I.B) has a higher metathesis activity in the metathesis degradation of nitrile rubber than that of the formula (I.A).

The amount of the catalyst used according to the invention for the metathesis is dependent on the nature and also the catalytic activity of the specific catalyst. The amount of catalyst used is 0.001 phr to 1 phr, preferably 0.002 phr to 0.1 phr, particularly preferably 0.004 phr to 0.008 phr, based on the nitrile rubber used.

The metathesis of nitrile rubber can be carried out without, or else in the presence of, a co-olefin. This is preferably a straight-chain or branched $C_2$-$C_{16}$ olefin. For example, ethylene, propylene, isobutene, styrene, 1-hexene or 1-octene are suitable. Use is preferably made of 1-hexene or 1-octene.

Co-olefins having two or more double bonds or containing a double bond and a carboxylic acid group or hydroxyl group are also suitable. If the co-olefin is liquid (for instance 1-hexene), the amount of the co-olefin is preferably in a range from 0.2 wt % to 20 wt % based on the nitrile rubber used. If the co-olefin is a gas, for instance ethylene, the amount of the co-olefin is chosen such that a pressure in the range from $1\times10^5$ Pa to $1\times10^7$ Pa is established in the reaction vessel at room temperature, preferably a pressure in the range from $5.2\times10^5$ Pa to $4\times10^6$ Pa.

The metathesis reaction can be carried out in a suitable solvent which does not deactivate the catalyst used and also does not negatively influence the reaction in any other way. Preferred solvents include, but are not limited to, dichloromethane, benzene, chlorobenzene, toluene, methyl ethyl ketone, acetone, tetrahydrofuran, tetrahydropyran, dioxane and cyclohexane. The particularly preferred solvent is chlorobenzene. In some cases, if the co-olefin can itself function as solvent, for instance in the case of 1-hexene, the addition of a further additional solvent can be dispensed with.

The concentration of the nitrile rubber used in the reaction mixture for the metathesis is not critical but care should of course be taken to ensure that the reaction is not negatively influenced by too high a viscosity of the reaction mixture and the associated mixing problems. The concentration of the nitrile rubber in the reaction mixture is preferably in the range from 1 to 20 wt %, particularly preferably in the range from 5 to 15 wt %, based on the total reaction mixture.

The metathesis degradation is customarily carried out at a temperature in the range from 10 to 150° C., preferably in the range from 20 to 100° C.

The reaction time is dependent on a number of factors, for example on the type of nitrile rubber, the type of catalyst, the catalyst concentration used and the reaction temperature. Typically, the reaction is ended within three hours under normal conditions. The progress of the metathesis can be monitored by standard analysis, for example can be followed by GPC measurements or by determining the viscosity.

Nitrile Rubber (NBR)

The nitrile rubbers ("NBR") used in the metathesis reaction may be copolymers or terpolymers comprising repeat units of at least one conjugated diene, at least one $\alpha,\beta$-unsaturated nitrile and optionally one or more further copolymerizable monomers.

Any conjugated diene can be used. Preference is given to using ($C_4$-$C_6$) conjugated dienes. Particular preference is given to 1,3-butadiene, isoprene, 2,3-dimethylbutadiene, piperylene or mixtures thereof. 1,3-Butadiene and isoprene or mixtures thereof are especially preferred. Very particular preference is given to 1,3-butadiene.

The $\alpha,\beta$-unsaturated nitrile used may be any known $\alpha,\beta$-unsaturated nitrile, preference being given to ($C_3$-$C_5$)-$\alpha,\beta$-unsaturated nitriles such as acrylonitrile, methacrylonitrile, ethacrylonitrile or mixtures thereof. Acrylonitrile is particularly preferred.

A copolymer of acrylonitrile and 1,3-butadiene is thus a particularly preferred nitrile rubber.

As well as the conjugated diene and the $\alpha,\beta$-unsaturated nitrile, one or more further copolymerizable monomers known to those skilled in the art may also be present. Further copolymerizable monomers which may be used are, for example, aromatic vinyl monomers, preferably styrene, $\alpha$-methylstyrene and vinylpyridine, fluorinated vinyl monomers, preferably fluoroethyl vinyl ether, fluoropropyl vinyl ether, o-fluoromethylstyrene, vinyl pentafluorobenzoate, difluoroethylene and tetrafluoroethylene, or else $\alpha$-olefins, preferably $C_2$-$C_{12}$ olefins, for example ethylene, 1-butene, 4-butene, 4-methyl-1-pentene, 1-hexene or 1-octene, non-conjugated dienes, preferably $C_4$-$C_{12}$ dienes such as 1,4-pentadiene, 1,4-hexadiene, 4-cyanocyclohexene, 4-vinylcyclohexene, vinylnorbornene, dicyclopentadiene or else alkynes such as 1- or 2-butyne, $\alpha,\beta$-ethylenically unsaturated monocarboxylic acids, preferably acrylic acid, methacrylic acid, crotonic acid or cinnamic acid, $\alpha,\beta$-ethylenically unsaturated monocarboxylic esters, preferably butyl acrylate, $\alpha,\beta$-ethylenically unsaturated dicarboxylic acids, preferably maleic acid, fumaric acid, citraconic acid, itaconic acid, $\alpha,\beta$-ethylenically unsaturated dicarboxylic monoesters, for example alkyl, especially $C_4$-$C_{18}$-alkyl, preferably n-butyl, tert-butyl, n-pentyl or n-hexyl, particularly preferably mono-n-butyl maleate, mono-n-butyl fumarate, mono-n-butyl citraconate, mono-n-butyl itaconate;

alkoxyalkyl, especially $C_4$-$C_{18}$-alkoxyalkyl, preferably $C_4$-$C_{12}$-alkoxyalkyl, hydroxyalkyl, especially $C_4$-$C_{18}$-hydroxyalkyl, preferably $C_4$-$C_{12}$-hydroxyalkyl, cycloalkyl, especially $C_5$-$C_{18}$-cycloalkyl, preferably $C_6$-$C_{12}$-cycloalkyl, more preferably monocyclopentyl maleate, monocyclohexyl maleate, monocycloheptyl maleate, monocyclopentyl fumarate, monocyclohexyl fumarate, monocycloheptyl fumarate, monocyclopentyl citraconate, monocyclohexyl citraconate, monocycloheptyl citraconate, monocyclopentyl itaconate, monocyclohexyl itaconate and monocycloheptyl itaconate, alkylcycloalkyl, especially $C_6$-$C_{12}$-alkylcycloalkyl, preferably $C_7$-$C_{10}$-alkylcycloalkyl, more preferably monomethylcyclopentyl maleate and monoethylcyclohexyl maleate, monomethylcyclopentyl fumarate and monoethylcyclohexyl fumarate, monomethylcyclopentyl citraconate and monoethylcyclohexyl citraconate; monomethylcyclopentyl itaconate and monoethylcyclohexyl itaconate;

aryl, especially $C_6$-$C_{14}$-aryl monoester, preferably monoaryl maleate, monoaryl fumarate, monoaryl citraconate or monoaryl itaconate, more preferably monophenyl maleate or monobenzyl maleate, monophenyl fumarate or monobenzyl fumarate, monophenyl citraconate or monobenzyl citraconate, monophenyl itaconates or monobenzyl itaconates or mixtures thereof, unsaturated polyalkyl polycarboxylates, for example dimethyl maleate, dimethyl fumarate, dimethyl itaconate or diethyl itaconate; or $\alpha,\beta$-ethylenically unsaturated carboxylic esters containing amino groups, for example dimethylaminomethyl acrylate or diethylaminoethyl acrylate copolymerizable antioxidants, for example N-(4-anilinophenyl)acrylamide, N-(4-anilinophenyl)methacrylamide, N-(4-anilinophenyl)cinnamide, N-(4-anilinophenyl)crotonamide, N-phenyl-4-(3-vinylbenzyloxy)aniline, N-phenyl-4-(4-vinylbenzyloxy)aniline or crosslinkable monomers, for example divinyl components, for example divinylbenzene; di(meth)acrylic esters, for example ethylene glycol di(meth)acrylate, diethylene glycol di(meth)acrylate, butanediol di(meth)acrylate or polyethylene glycol di(meth)acrylate, or tri(meth)acrylic esters, for example trimethylolpropane tri(meth)acrylate; self-crosslinkable monomers, for example N-methylol(meth)acrylamide or N,N'-dimethylol(meth)acrylamide.

As well as the $\alpha,\beta$-ethylenically unsaturated nitrile units and the conjugated diene units, a PEG-acrylate of the general formula (J) may also be used as further copolymerizable monomer

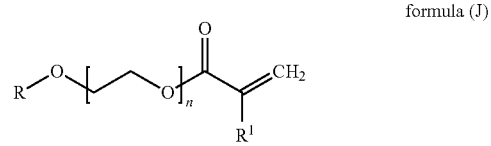

formula (J)

wherein
R is hydrogen or branched or unbranched $C_1$-$C_{20}$ alkyl, preferably methyl, ethyl, butyl or ethylhexyl,
n is 1 to 8, preferably 2 to 8, particularly preferably 2 to 5 and very particularly preferably 2 and
$R^1$ is hydrogen or $CH_3$—.

The term "(meth)acrylate" in the context of this invention represents "acrylate" and "methacrylate". If the $R^1$ radical of the general formula (J) is $CH_3$—, the molecule is a methacrylate.

The term "polyethylene glycol" or the abbreviation "PEG" in the context of this invention represents both monoethylene glycol sections having one repeat ethylene glycol unit (PEG-1; n=1) and polyethylene glycol sections having 2 to 8 repeat ethylene glycol units (PEG-2 to PEG-8; n=2 to 8).

The term "PEG acrylate" is also abbreviated to PEG-X-(M)A where "X" is the number of repeat ethylene glycol units, "MA" is methacrylate and "A" is acrylate.

Acrylate units derived from PEG acrylates of the general formula (J) are referred to in the context of this invention as "PEG acrylate unit".

Preferred PEG acrylate units are derived from the PEG acrylates of the following formulae no. 1 to no. 10, wherein n is 1, 2, 3, 4, 5, 6, 7 or 8, preferably 2, 3, 4, 5, 6, 7 or 8, particularly preferably 2, 3, 4 or 5 and very particularly preferably 2:

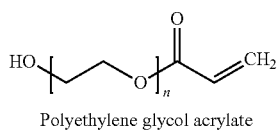

Polyethylene glycol acrylate (Formula no. 1)

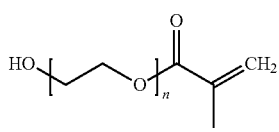

Polyethylene glycol methacrylate (Formula no. 2)

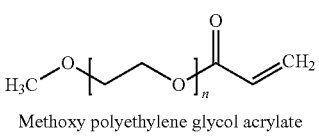

Methoxy polyethylene glycol acrylate (Formula no. 3)

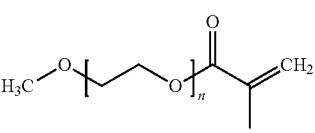

Methoxy polyethylene glycol methacrylate (Formula no. 4)

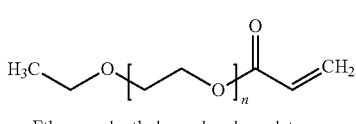

Ethoxy polyethylene glycol acrylate (Formula no. 5)

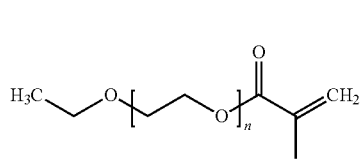

Ethoxy polyethylene glycol methacrylate (Formula No. 6)

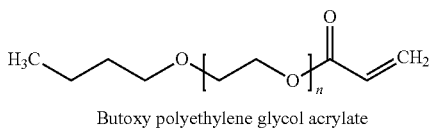

Butoxy polyethylene glycol acrylate (Formula no. 7)

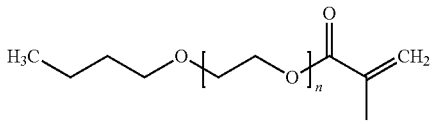

Butoxy polyethylene glycol methacrylate (Formula no. 8)

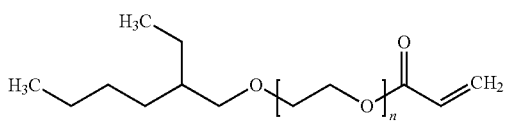

Ethylhexyloxy polyethylene glycol acrylate (Formula no. 9)

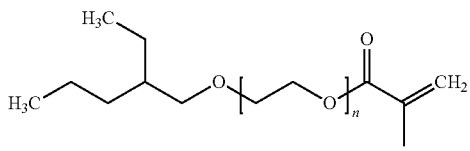

Ethylhexyloxy polyethylene glycol methacrylate (Formula no. 10)

Other commonly used names for methoxy polyethylene glycol acrylate (formula no. 3) are, for example, poly (ethylene glycol) methyl ether acrylate, acryl-PEG, methoxy-PEG acrylate, methoxy poly(ethylene glycol) monoacrylate, poly(ethylene glycol) monomethyl ether monoacrylate or mPEG acrylate.

These PEG acrylates can be purchased commercially, for example from Arkema under the Sartomer® trade name, from Evonik under the Visiomer® trade name, or from Sigma Aldrich.

The proportions of conjugated diene and α,β-unsaturated nitrile in the nitrile rubbers to be used can fluctuate within wide ranges. The proportion of, or of the sum of, the conjugated diene(s) is typically in the range from 40 to 90 wt %, preferably in the range from 55 to 75 wt %, based on the overall polymer. The proportion of, or of the sum of, the α,β-unsaturated nitrile(s) is typically 10 to 60 wt %, preferably 25 to 45 wt %, based on the overall polymer. The proportions of the monomers in each case add up to 100 wt %. The additional monomers may be present in amounts of 0 to 5 wt %, preferably 0.1 to 40 wt %, particularly preferably 1 to 30 wt %, based on the overall polymer. In this case, corresponding proportions of the conjugated diene(s) and/or of the α,β-unsaturated nitrile(s) are replaced by the proportions of the additional monomers, with the proportions of all monomers adding up in each case to 100 wt %.

The preparation of the nitrile rubbers by polymerization of the abovementioned monomers is sufficiently well-known to those skilled in the art and extensively described in the polymer literature.

Nitrile rubbers which can be used in the context of the invention are furthermore commercially available, e.g. as products from the product series of the trade names Perbunan® and Krynac© from the company ARLANXEO, of the trade name Nipol® from the company Zeon, of the trade name Europrene® from the company Versalis, of the trade name Nancar® from the company Nantex or of the trade name KNB from the company Kumho.

The nitrile rubbers used for the metathesis have a Mooney viscosity (ML 1+4 at 100° C.) in the range from 30 to 70 MU, preferably from 30 to 50 MU. This corresponds to a weight-average molecular weight Mw in the range from 200 000 to 500 000 g/mol, preferably in the range from 200 000 to 400 000 g/mol. The nitrile rubbers used also have a polydispersity PDI=Mw/Mn, where Mw is the weight-average and Mn is the number-average molecular weight, in the range from 2.0 to 6.0, preferably in the range from 3.0 to 5.0 and particularly preferably in the range from 3.5 to 4.5.

The Mooney viscosity is determined here to ASTM Standard D 1646.

The nitrile rubbers obtained by the inventive method of metathesis degradation have a Mooney viscosity (ML 1+4 @100° C.) in the range from 5 to 30 MU, preferably from 5 to 20 MU. This corresponds to a weight-average molecular weight Mw in the range from 10 000 to 200 000 g/mol, preferably in the range from 10 000 to 150 000 g/mol. The nitrile rubbers obtained also have a polydispersity PDI=Mw/Mn, where Mn is the number-average molecular weight, in the range from 1.5 to 4.0, preferably in the range from 1.7 to 3.

Hydrogenation

The inventive method of metathesis degradation may be followed by a hydrogenation of the degraded nitrile rubbers obtained. This may be carried out in the manner known to those skilled in the art.

It is possible to conduct the hydrogenation using homogeneous or heterogeneous hydrogenation catalysts. It is also possible to conduct the hydrogenation in situ, i.e. in the same reaction vessel in which the metathesis degradation was also carried out beforehand and without the need to isolate the degraded nitrile rubber. The hydrogenation catalyst is simply added to the reaction vessel.

The catalysts used are customarily based on rhodium, ruthenium or titanium, but it is also possible to use platinum, iridium, palladium, rhenium, ruthenium, osmium, cobalt or copper, either as the metal or else preferably in the form of metal compounds (see, for example, U.S. Pat. No. 3,700,637, DE-A-2 539 132, EP-A-0 134 023, DE-OS-35 41 689, DE-OS-35 40 918, EP-A-0 298 386, DE-OS-35 29 252, DE-OS-34 33 392, U.S. Pat. Nos. 4,464,515 and 4,503,196).

Suitable catalysts and solvents for a hydrogenation in homogeneous phase are described hereinafter and are also known from DE-A-25 39 132 and EP-A-0 471 250.

The selective hydrogenation can be achieved, for example, in the presence of a rhodium- or ruthenium-containing catalyst. Use may for example be made of a catalyst of the general formula $(R^1{}_mB)_lMX_n$, in which M is ruthenium or rhodium, $R^1$ are the same or different and are a $C_1$-$C_8$ alkyl group, a $C_4$-$C_8$ cycloalkyl group, a $C_6$-$C_{15}$ aryl group or a $C_7$-$C_{15}$ aralkyl group. B is phosphorus, arsenic, sulfur or a sulfoxide group (S=O), X is hydrogen or an anion, preferably a halogen and particularly preferably chlorine or bromine, l is 2, 3 or 4, m is 2 or 3 and n is 1, 2 or 3, preferably 1 or 3. Preferred catalysts are tris(triphenylphosphine)rhodium(I) chloride, tris(triphenylphosphine)rhodium(III) chloride and tris(dimethyl sulfoxide)rhodium (III) chloride, and also tetrakis(triphenylphosphine)rhodium hydride of the formula $((C_6H_5)_3P)_4RhH$ and the corresponding compounds in which the triphenylphosphine has been replaced fully or partly by tricyclohexylphosphine. The catalyst can be used in small amounts. An amount in the range from 0.01 to 1 wt %, preferably in the range from 0.03 to 0.5 wt % and particularly preferably in the range from 0.1 to 0.3 wt %, based on the weight of the polymer, is suitable.

It is customarily advisable to use the catalyst together with a cocatalyst which is a ligand of the formula $R^1mB$, wherein $R^1$, m and B have the meanings given above for the catalyst. Preferably, m is 3, B is phosphorus and the $R^1$ radicals may be the same or different. The cocatalysts preferably have trialkyl, tricycloalkyl, triaryl, triaralkyl, diaryl monoalkyl, diaryl monocycloalkyl, dialkyl monoaryl, dialkyl monocycloalkyl, dicycloalkyl monoaryl or dicycloalkyl monoaryl radicals.

Examples of cocatalysts can be found in U.S. Pat. No. 4,631,315. A preferred cocatalyst is triphenylphosphine. The cocatalyst is used preferably in amounts in a range from 0.3 to 5 wt %, preferably in the range from 0.5 to 4 wt %, based on the weight of the nitrile rubber to be hydrogenated. Preferably, in addition, the weight ratio of the rhodium-containing catalyst to the cocatalyst is in the range from 1:3 to 1:55, preferably in the range from 1:5 to 1:45. Based on 100 parts by weight of the nitrile rubber to be hydrogenated, use is suitably made of 0.1 to 33 parts by weight of the cocatalyst, preferably 0.5 to 20 and very particularly preferably 1 to 5 parts by weight, especially more than 2 but less than 5 parts by weight, of cocatalyst based on 100 parts by weight of the nitrile rubber to be hydrogenated.

The practical conduct of this hydrogenation is sufficiently well-known to those skilled in the art from U.S. Pat. No. 6,683,136. It is effected typically by contacting the nitrile rubber to be hydrogenated with hydrogen in a solvent such as toluene or monochlorobenzene at a temperature in the range from 100 to 150° C. and a pressure in the range from 50 to 150 bar for 2 to 10 h.

In the context of this invention, hydrogenation is understood to mean a conversion of the double bonds present in the starting nitrile rubber to an extent of at least 50%, preferably 70-100%, particularly preferably 80 to 100%.

In the case of use of heterogeneous catalysts, these are typically supported catalysts based on palladium, which are supported, for example, on charcoal, silica, calcium carbonate or barium sulfate.

On completion of the hydrogenation, a hydrogenated nitrile rubber having a Mooney viscosity (ML(1+4) at 100° C.), measured according to ASTM Standard D 1646, in the range from 10 to 50 MU, preferably from 10 to 30 MU, is obtained. This corresponds to a weight-average molecular weight Mw in the range from 2000 to 400 000 g/mol, preferably in the range from 20 000 to 200 000 g/mol. The hydrogenated nitrile rubbers obtained also have a polydispersity PDI=Mw/Mn, where Mw is the weight-average and Mn the number-average molecular weight, in the range from 1 to 5 and preferably in the range from 1.5 to 3.

The catalysts (I.A), (I.B) and (I.C) can be used in the hydrogenation of the nitrile rubber to give hydrogenated nitrile rubber (HNBR).

The invention therefore further relates to a method for reducing the molecular weight of nitrile rubber, characterized in that nitrile rubber is brought into contact with one of the catalysts of the formulae (I.A), (I.B) and (I.C).

The advantage of the invention is especially the high metathesis activity of the catalysts in the metathesis degradation of nitrile rubber.

A further advantage is that the metathesis degradation of nitrile rubber takes place using the catalysts of the formula (I.A), (I.B) and (I.C) without noticeable gel formation (<3 wt %).

EXAMPLES

Metathesis degradation of nitrile rubber in the presence of different catalysts

The following examples show that the catalysts of the formulae (I.A), (I.B.) and (I.C) have metathesis activity in the metathesis degradation of nitrile rubber, in each case at the same dose.

The following catalysts were used:

"Grubbs II catalyst" (comparative example 1): [1,3-bis-(2,4,6-trimethylphenyl)-2-imidazolidinylidene3]dichloro(phenylmethylene)(tricyclohexylphosphine)ruthenium (CAS number: 246047-72-3), $C_{46}H_{65}Cl_2N_2PRu$ weight: 848.97 g/mol; the Grubbs II catalyst was obtained from the company Materia Inc.

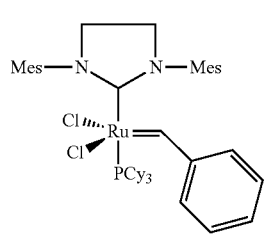

Grubbs II catalyst

"Hoveyda-Grubbs II catalyst" (comparative example 2): [1,3-Bis-(2,4,6-trimethylphenyl)-2-imidazolidinylidene]dichloro(o-isopropoxyphenylmethylene)ruthenium (CAS number 301224-40-8); $C_{31}H_{38}Cl_2N_2ORu$, weight: 626.62 g/mol; the Hoveyda-Grubbs II catalyst was obtained from the company Materia Inc.

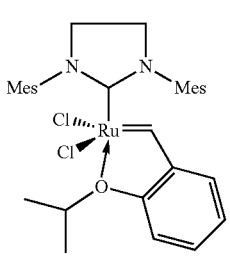

Hoveyda-Grubbs II catalyst

Catalyst (I.A) (inventive example (I)): [1,3-Bis(2,6-diisopropylphenyl)imidazolidin-2-ylidene]{2-ethyl-3-oxo-3,4-dihydro-2H-benzo[b][1,4]oxazin-8-yl]methylene}ruthenium(II) dichloride; $C_{38}H_{50}Cl_2N_3O_2Ru$; molecular weight: 752.23 g/mol; green powder. The catalyst of the formula (I.B) can be prepared according to the method disclosed in WO-A-2012/013208.

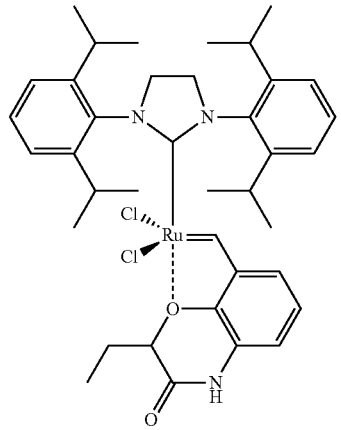

(I.A)

Catalyst (I.B) (inventive example (II)): [1,3-Bis(2,6-diisopropylphenyl)imidazolidin-2-ylidene]{(2-ethyl-4-(isobutoxycarbonyl)-3-oxo-3,4-dihydro-2H-benzene[b][1,4]oxazin-8-yl)methylene}ruthenium(II) dichloride; $C_{43}H_{58}Cl_2N_3O_4Ru$; molecular weight: 852.28 g/mol; green powder. The catalyst of the formula (I.B) can be prepared according to the method disclosed in WO-A-2012/013208.

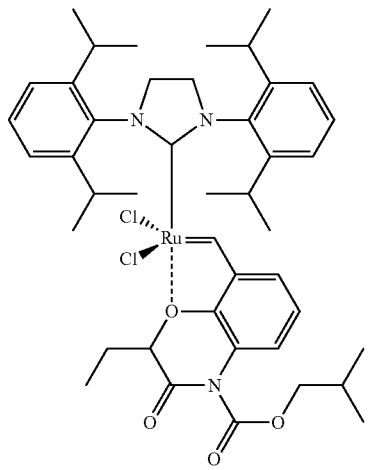

(I.B)

Catalyst (I.C) (inventive example (III)): [1,3-Bis(2,6-diisopropylphenyl)imidazolidin-2-ylidene]{(2-ethyl-3-oxo-4-(perfluorophenylcarbonyl)-3,4-dihydro-2H-benzo[b][1,4]oxazin-8-yl)methylene}ruthenium(II) dichloride $C_{45}H_{49}Cl_2F_5N_3O_3Ru$; molecular weight: 946.21° g/mol; green powder. The catalyst of the formula (I.C) can be prepared according to the method disclosed in WO-A-2012/013208.

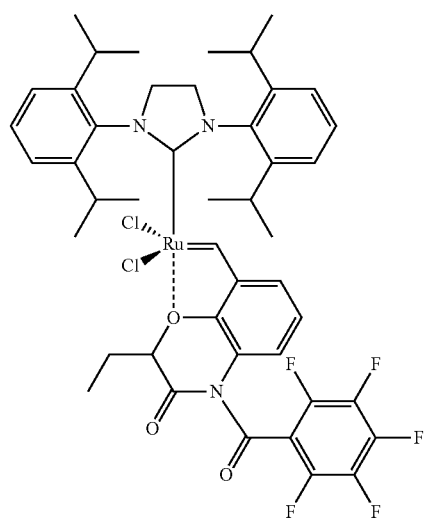

(I.C)

The degradation reactions described below were carried out using a nitrile rubber from ARLANXEO with 34 wt % acrylonitrile content; a Mooney viscosity (ML 1+4 @100° C.) of 34 MU and a residual double bond content (RDB) of 100%. This nitrile rubber is abbreviated to NBR below.

General Description of the Metathesis Reactions Carried Out:

425 g of chlorobenzene (MCB; Aldrich) were used in each case for the metathesis degradation. 75 g of NBR were dissolved therein over a period of 24 h at room temperature.

TABLE 1

Analytical data for the NBR solution before the metathesis reaction

| Analytical data | NBR solution |
| --- | --- |
| Mw [g/mol] | 282 066 |
| Mn [g/mol] | 78 392 |
| PDI | 3.6 |

In each case 3.1 g (4 phr) of 1-hexene were added to the NBR-containing solution and mixed to homogenize for 120 min on an agitator.

The 0.0049 g (0.0065 phr) of ruthenium-containing catalyst were in each case dissolved in 5 ml of MCB at room temperature. The catalyst solutions were added to the NBR solutions in MCB immediately after the catalyst solutions were prepared.

After 24 hours at room temperature on an agitator, the metathesis reaction stopped and in each case 5 ml of the reaction solution were used for the GPC.

The molecular weight is determined by gel permeation chromatography (GPC) according to DIN-55672-1 Version 2007. A modular system was used, having a Shodex RI-71 differential refractometer, S 5200 autosampler (from SFD), column oven (ERC-125), Shimadzu LC 10 AT pump and a column combination of 3 PLgel 10 μm Mixed B 300×7.5 mm columns from Agilent.

The solvent used was tetrahydrofuran; the molecular weights present are based on polystyrene standards from PSS (Mainz). The finished THF sample solutions are filtered through syringe filters having 0.45 μm PTFE membranes and diameter 25 mm. The measurements were conducted at 40° C. and a flow rate of 1 ml/min in tetrahydrofuran.

The molecular parameters such as number-average molecular weight Mn, mass-average molecular weight Mw and the resulting polydispersity index PDI are determined from the RI signal by means of the "Empower 2 data base" software from Waters.

GPC analysis was used to determine the following characteristic variables both for the original NBR rubber (prior to degradation) and the degraded nitrile rubbers:

Mw [g/mol]: weight-average molecular weight

Mn [g/mol]: number-average molecular weight

PDI: width of the molecular weight distribution (Mw/Mn)

Comparison of the Activity of the Tested Catalysts in the Presence of 4 Phr of 1-Hexene The activity of the comparative catalysts "Grubbs II catalyst" (V1) and "Hoveyda-Grubbs II catalyst" (V2) with the catalysts of the formulae (I.A), (I.B) and (I.C) was compared at a catalyst concentration of 0.0065 phr (0.0049 g) and a dose of 4.0 phr (3.1 g) of the cocatalyst 1-hexene.

TABLE 2

Molecular weight and PDI of the nitrile rubbers after 24 h of metathesis in the presence of the comparative catalysts V1 and V2 and also the inventive catalysts (I.A), (I.B) and (I.C) compared to the initial values at the start

| Analytica ldata | Start 0 h | V1 24 h | V2 24 h | (I)* 24 h | (II)* 24 h | (III)* 24 h |
| --- | --- | --- | --- | --- | --- | --- |
| Mw [g/mol] | 282 066 | 155 368 | 120 560 | 108 864 | 106 482 | 121 723 |
| Mn [g/mol] | 78 392 | 57 467 | 46 641 | 42 768 | 42 342 | 47 581 |
| PDI | 3.6 | 2.7 | 2.6 | 2.5 | 2.5 | 2.6 |

*Inventive examples

The use of the catalysts (I.A), (I.B) and (I.C) leads to a metathesis degradation of nitrile rubber without noticeable gel formation.

The comparison of the decrease in the weight-average molecular weight Mw of the nitrile rubber in the inventive examples (I)* and (II)* shows that the activity of the catalysts (I.A) and (I.B) is considerably greater than in the comparative catalysts used in the comparative examples V1 and V2, Grubbs II catalyst and Hoveyda-Grubbs II catalyst. For in each case identical reaction times, lower molar masses are achieved with the catalysts (I.A) and (I.B) than with the comparative catalysts V1 and V2 and also the further inventive catalyst (I.C). The inventive catalyst (I.C) exhibits greater reduction in the weight-average molecular weight Mw and the PDI after 24 hours of metathesis reaction than the comparative catalyst Grubbs II and virtually the same reduction in the weight-average molecular weight Mw and the PDI after 24 hours of metathesis reaction as the comparative catalyst Hoveyda-Grubbs II. The inventive catalysts (I.A), (IB) and (I.C) are thus suitable for use in a method for the metathesis of nitrile rubber.

The metathesis degradation of nitrile rubber using the catalysts of the formula (I.A), (I.B) and (I.C) takes place without noticeable gel formation (<3 wt %).

The invention claimed is:

1. A method comprising a step of the use of at least one catalyst of the general formula (I)

formula (I)

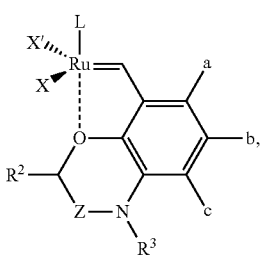

wherein
X and X¹ in each case independently of one another are halogens,
L is an uncharged ligand of the formula L¹, L², L³ or L⁴,

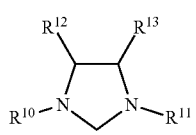

(L¹)

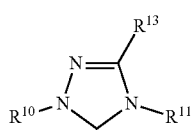

(L²)

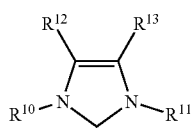

(L³)

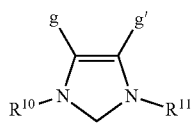

(L⁴)

wherein $R^{10}$ and $R^{11}$ in each case independently of one another are a substituted or unsubstituted side chain comprising 1 to 30 carbon atoms and optionally comprising one or more functional groups, and
wherein $R^{12}$ and $R^{13}$ in each case independently of one another are H, $C_{1-6}$ alkyl, optionally substituted with an alkoxy radical $OR^{15}$, or aryl optionally substituted with an alkoxy radical $OR^{15}$, or form a 3- or 4-membered alkene bridge, and
wherein $R^{15}$ is selected from the group consisting of $C_{1-20}$ alkyl, aryl and $C_{7-18}$ aralkyl, and
wherein g and g' are in each case halogens,
z is a methylene or carbonyl group,
a, b and c are in each case H;
$R^2$ is selected from the group consisting of H, $C_{1-12}$ alkyl; and
$R^3$ is selected from the group consisting of H, $C_{1-12}$ alkyl, $C_{5-12}$ cycloalkyl, $C_{7-18}$ aralkyl, aryl, $C_{1-12}$ haloalkyl, $C_{1-12}$ ammonium alkyl, $C_{1-12}$ pyridinium alkyl, $C_{1-12}$ aldehyde alkyl, $C_{1-12}$ nitroalkyl, nitrile or a radical selected from the group consisting of ketones $COR^4$, esters $CO_2R^4$, oxalates $COCO_2R^4$, sulfones $SO_2R^4$ or amides $CONHR^4$, where $R^4$ is selected from the group consisting of H, $C_{1-12}$ alkyl, $C_{5-12}$ cycloalkyl, $C_{7-18}$ aralkyl, aryl, $C_{1-12}$ haloalkyl, $C_{1-12}$ ammonium alkyl, $C_{1-12}$ pyridinium alkyl, $C_{1-12}$ aldehyde alkyl, $C_{1-12}$ nitroalkyl and nitrile, or $R^3$ is a side chain of the formula $R^{3c}$, $R^{3d}$, $R^{3e}$, $R^{3f}$, $R^{3g}$, $R^{3h}$, $R^{3i}$, $R^{3j}$, $R^{3k}$, $R^{3l}$, $R^{3m}$, $R^{3n}$, $R^{3o}$ or $R^{3p}$:

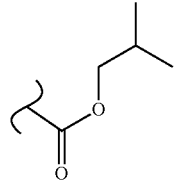

($R^{3c}$)

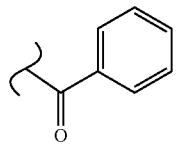

($R^{3d}$)

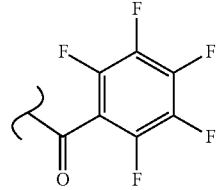

($R^{3e}$)

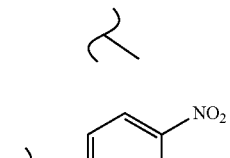

($R^{3f}$)

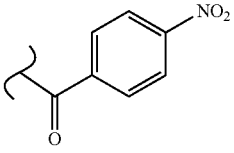

($R^{3g}$)

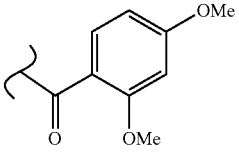

($R^{3h}$)

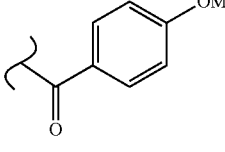

($R^{3i}$)

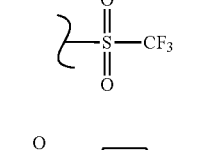

($R^{3j}$)

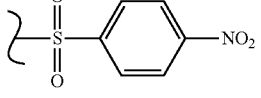

($R^{3k}$)

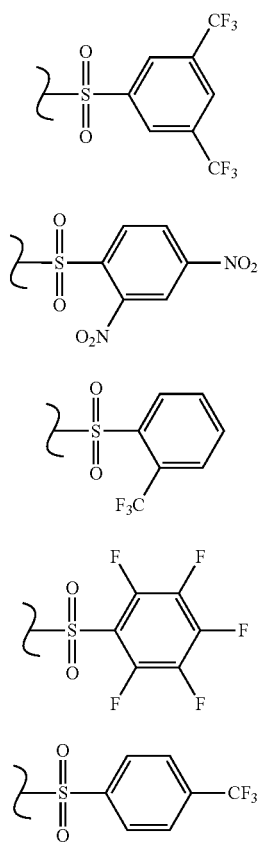

or, if z is methyl, $R^3$ is a side chain of the formula $R^{3a}$ or $R^{3b}$:

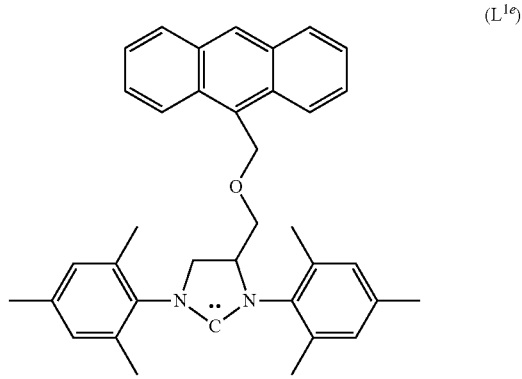

wherein $A^-$ is selected from the group consisting of $F^-$, $Cl^-$, $Br^-$, $I^-$, tetrafluoroborate $BF_4^-$, hexafluorophosphate $PF_6^-$ and bis(trifluoromethylsulfonyl)amide $NTf_2^-$, in a metathesis reaction of nitrile rubber.

2. The method of claim 1, wherein: $R^{10}$ and $R^{11}$ in each case independently of one another are $C_{1-30}$ alkyl, optionally substituted with an alkoxy radical $OR^{15}$, $C_{2-30}$ alkenyl, optionally substituted with an alkoxy radical $OR^{15}$, aryl, optionally substituted with an alkoxy radical $OR^{15}$, aminoalkyl or aminocycloalkyl.

3. The method of claim 1 wherein: the ligand L in the catalyst of the general formula (I) has the following meanings ($L^{1a}$), ($L^{1b}$), ($L^{1c}$), ($L^{1d}$), ($L^{1e}$), ($L^{1f}$), ($L^{1g}$):

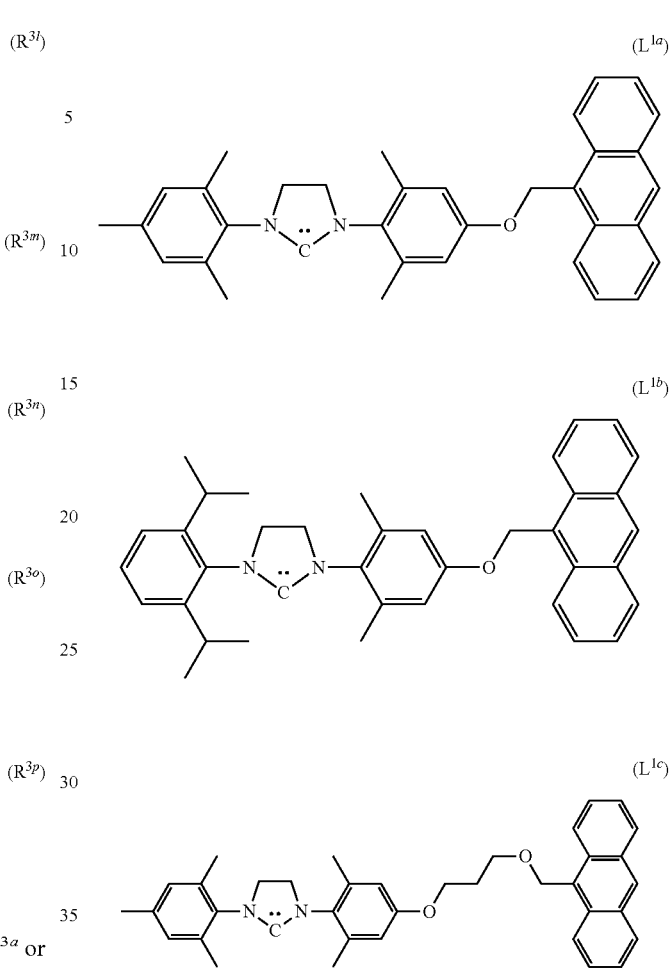

-continued

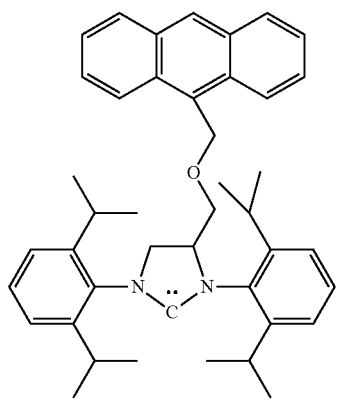
(L$^{1f}$)

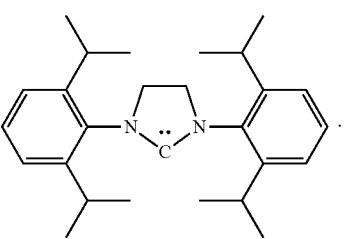
(L$^{1g}$)

4. The method of claim 1 wherein the ligand L of the general formula (I) is

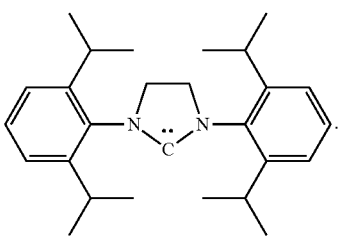
(L$^{1g}$)

5. The method of claim 1 wherein the radical R$^3$ in the catalyst of the general formula (I) is hydrogen or a side chain of the formula R$^{3c}$, R$^{3d}$, R$^{3e}$, R$^{3f}$, R$^{3g}$, R$^{3h}$, R$^{3i}$, R$^{3k}$, R$^{3l}$, R$^{3m}$, R$^{3n}$, R$^{3o}$ or R$^{3p}$.

6. The method of claim 1 wherein the radical R$^3$ in the catalyst of the general formula (I) is hydrogen or a side chain of the formula R$^{3c}$ or R$^{3e}$.

7. The method of claim 1 wherein the catalyst of the general formula (I) has the following meanings:

X is Cl;
L is L$^{1g}$;
z is carbonyl;
a, b, c are H;
R$^2$ is C$_1$-C$_{12}$ alkyl, and
R$^3$ is H, R$^{3c}$ or R$^{3e}$.

8. The method of claim 1 wherein the catalyst of the general formula (I) is a catalyst of the formulae (I.A), (I.B) or (I.C):

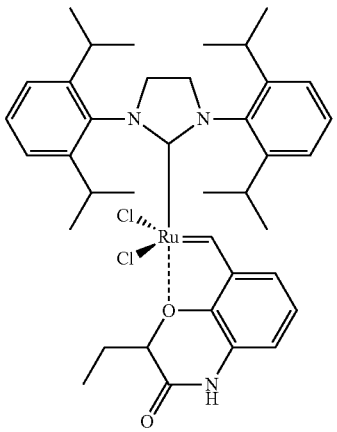
(I.A)

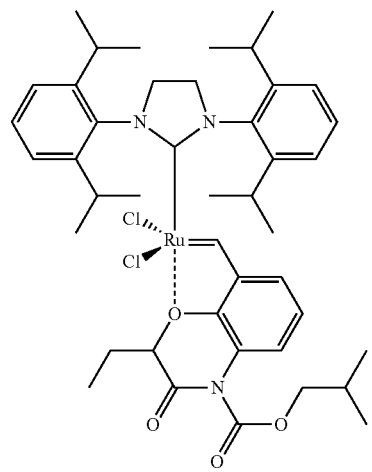
(I.B)

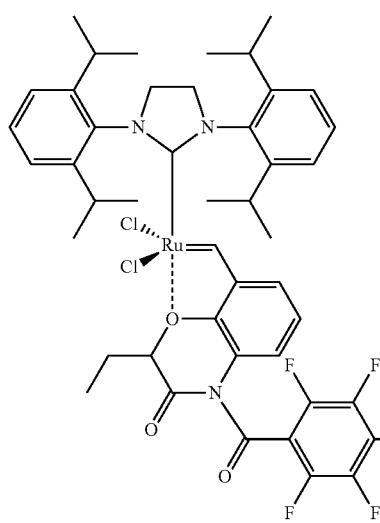
(I.C)

9. The method of claim 8 wherein the amount of catalyst used is 0.002 phr to 0.1 phr.

10. The method of claim 1, wherein the amount of catalyst used is 0.001 phr to 1 phr, based on the nitrile rubber used.

11. The method of claim 1, wherein the metathesis reaction is carried out without, or in the presence of, a co-olefin.

12. The method of claim 11, wherein the co-olefin is a straight-chain or branched C$_2$-C$_{16}$ olefin.

13. The method of claim 1 wherein the nitrile rubbers ares based on copolymers or terpolymers comprising repeat units of at least one conjugated diene, at least one α,β-unsaturated nitrile and optionally one or more further copolymerizable monomers.

14. The method of claim 13, wherein the copolymerizable monomers, are based on α,β-unsaturated mono- or dicarboxylic acids, or alkyl esters thereof, or alkoxyalkyl esters thereof, or PEG acrylate of the general formula (J)

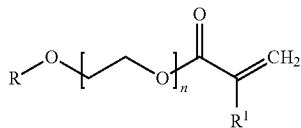

formula (J)

wherein

R is hydrogen or branched or unbranched $C_1$-$C_{20}$ alkyl, n is 1 to 8, and $R^1$ is hydrogen or $CH_3$—, and also mixtures of the abovementioned copolymerizable monomers.

15. The method of claim 1 wherein the nitrile rubbers used in the metathesis reaction have a Mooney viscosity (ML 1+4 at 100° C.) in the range from 30 to 70 MU.

16. The method of claim 1 wherein the metathesis reaction takes place in a reaction mixture and wherein the concentration of the nitrile rubber in the reaction mixture is in the range from 1 to 20 wt % of the reaction mixture.

17. The method of claim 1, wherein the metathesis reaction is carried out in a solvent.

18. The method of claim 1, wherein the metathesis reaction is carried out at a temperature in the range from 10° C. to 150° C.

19. The method of claim 1, wherein the metathesis reaction is a method of reducing the molecular weight of nitrile rubber, wherein a nitrile rubber is subjected to a metathesis degradation in the presence of a catalyst of the general formula (I).

20. The method of claim 1, wherein the metathesis reaction is a method of preparing hydrogenated nitrile rubbers, wherein a nitrile rubber is subjected to a metathesis degradation in the presence of a catalyst of the general formula (I), and the resultant nitrile rubber obtained is subsequently subjected to a hydrogenation.

* * * * *